Feb. 7, 1956 R. A. ZACHARY ET AL 2,734,168
ELECTRICAL PHASE DISCRIMINATOR CIRCUITS
Filed April 17, 1950 3 Sheets-Sheet 1
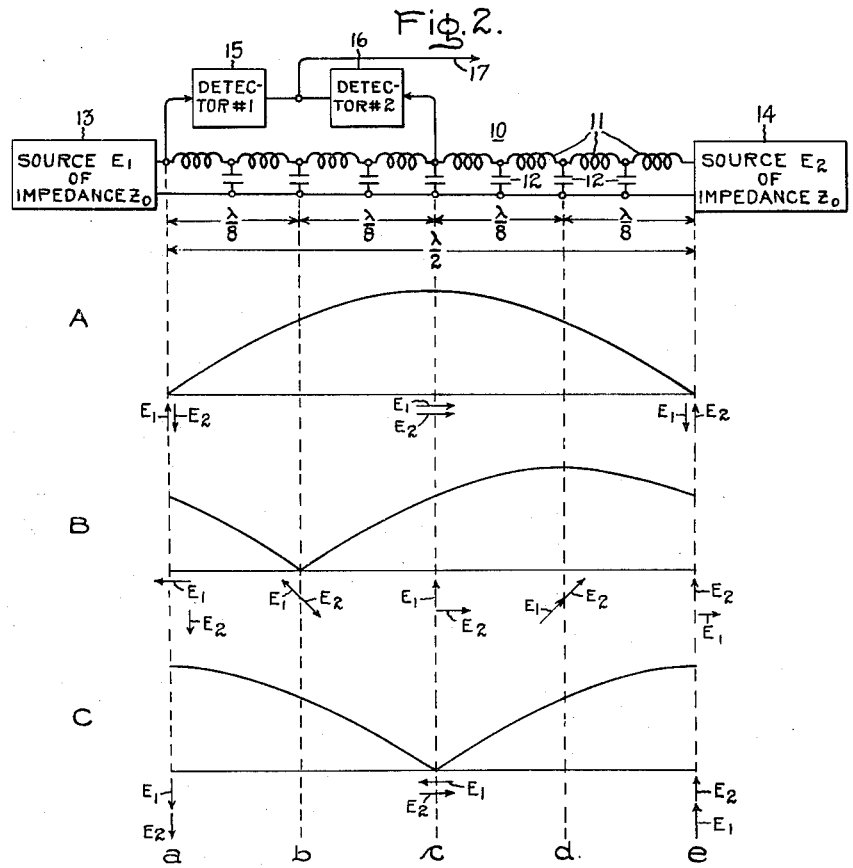
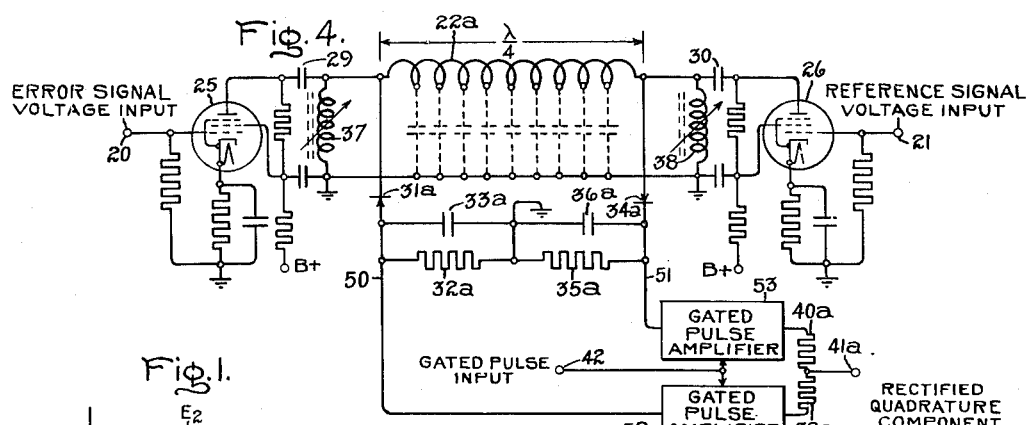
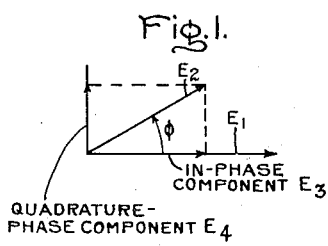
Inventors:
Robert A. Zachary,
John G. Schermerhorn,
by Merton D. Moore
Their Attorney.

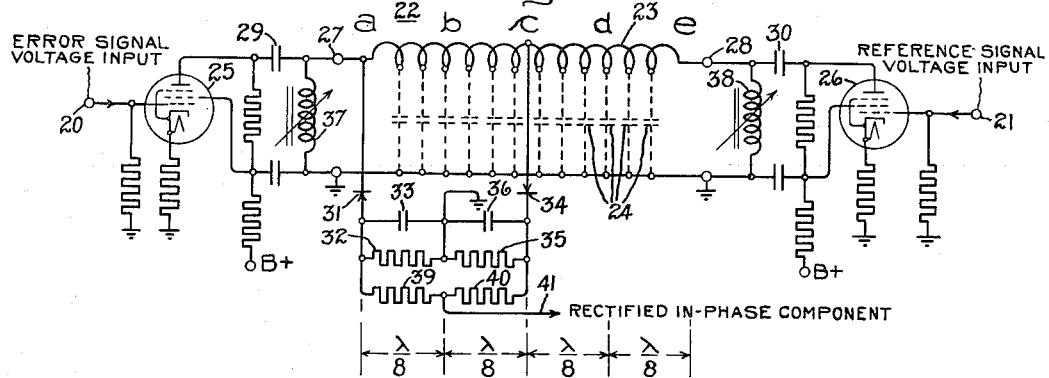
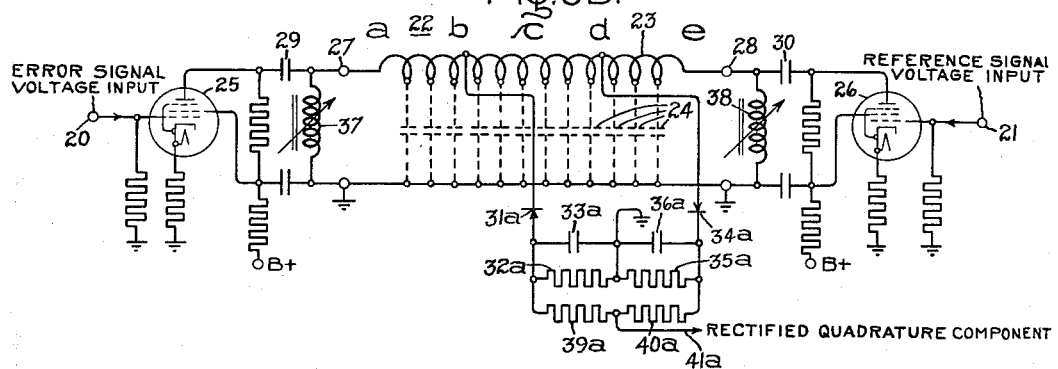
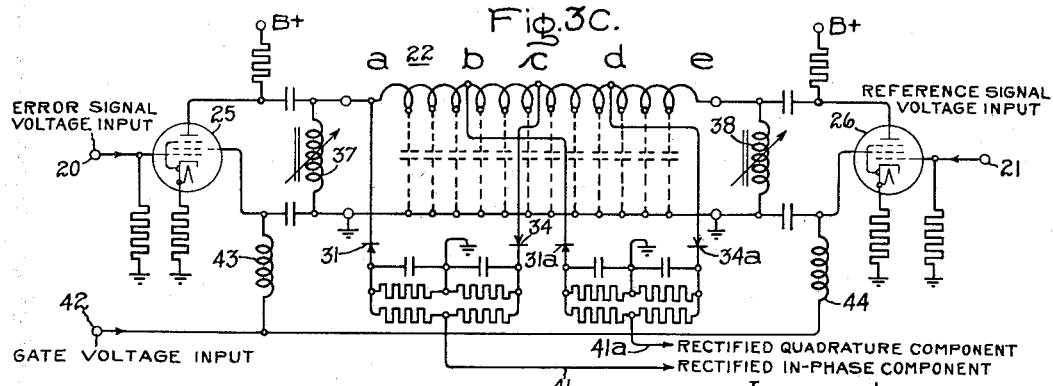

Inventors:
Robert A. Zachary,
John G. Schermerhorn,
by Merton D. Moore
Their Attorney.

United States Patent Office 2,734,168
Patented Feb. 7, 1956.

2,734,168

ELECTRICAL PHASE DISCRIMINATOR CIRCUITS

Robert A. Zachary and John G. Schermerhorn, Syracuse, N. Y., assignors to General Electric Company, a corporation of New York Application April 17, 1950, Serial No. 156,298

13 Claims. (Cl. 324—83)

Our invention relates to electrical circuits responsive to the phase angle between two alternating signal voltages of the same frequency but of unknown phase relation.

Such circuits have a wide variety of applications in phase meters and phase measuring apparatus, servomechanisms, electrical synchronizing circuits, etc. In particular, the circuits of our invention have utility in radar tracking systems of the phase or amplitude comparison types. In such radar systems, a pulse reference voltage is derived from the ultra-high frequency echo pulses which are received by a directive antenna system directed toward a remote reflecting target. Echo pulses from the target are also utilized to produce a pulse error voltage whose magnitude and phase, with respect to the pulse reference voltage, are respectively functions of the magnitude and sense of the angular deviation of the target with respect to the axis of directivity of the antenna system. A phase discriminator circuit is then employed to compare the reference signal and the error signal and to produce a unidirectional control voltage whose magnitude and polarity are also functions of the target position. For further details of radar tracking systems particularly adapted to employ our improved phase discriminator circuits, reference may be made to the copending applications Serial No. 238,112, filed July 23, 1951 by Oliver H. Winn for Radar Tracking and Amplifying Systems and Serial No. 238,071, filed July 23, 1951 by Walter Hausz for Radar Tracking and Antenna Systems, both of which are assigned to the same assignee as the present invention.

It is accordingly a main object of our invention to provide improved phase comparator circuits for producing a unidirectional output voltage whose magnitude is a function of the magnitude of the phase difference between two signals of the same high, or ultra-high frequency and whose polarity is a function of the sense of the phase difference.

Another object of our invention is to provide an improved phase discriminator which produces a unidirectional output voltage whose magnitude and sign are functions of the magnitude and sign of a particular vector component of a high frequency error voltage with respect to a high frequency reference voltage.

More specifically, it is an object of our invention to provide an improved phase discriminator circuit which electrically measures the magnitude and sense of either the in-phase or quadrature-phase component of an alternating error signal with respect to an alternating reference signal of the same frequency.

It is also a further object of our invention to provide improved phase responsive circuits which are insensitive to frequency shifts about resonance in the reference voltage when the error voltage is zero and which are very stable at ultra-high frequencies.

For additional objects and advantages, and for a better understanding of the invention, attention is now directed to the following description and accompanying drawings. The features of the invention believed to be novel are particularly pointed out in the appended claims.

In the drawings:

Fig. 1 is a voltage vector diagram which will be used in explaining certain principles of the invention;

Fig. 2 is a generalized schematic diagram of a phase discriminator circuit embodying our invention, together with a group of voltage curves which will be referred to in explaining the operation of the circuit;

Figs. 3A, 3B and 3C are detailed circuit diagrams of three similar embodiments of the invention;

Fig. 4 is a circuit diagram of another form of phase discriminator circuit embodying our invention;

Figure 5:
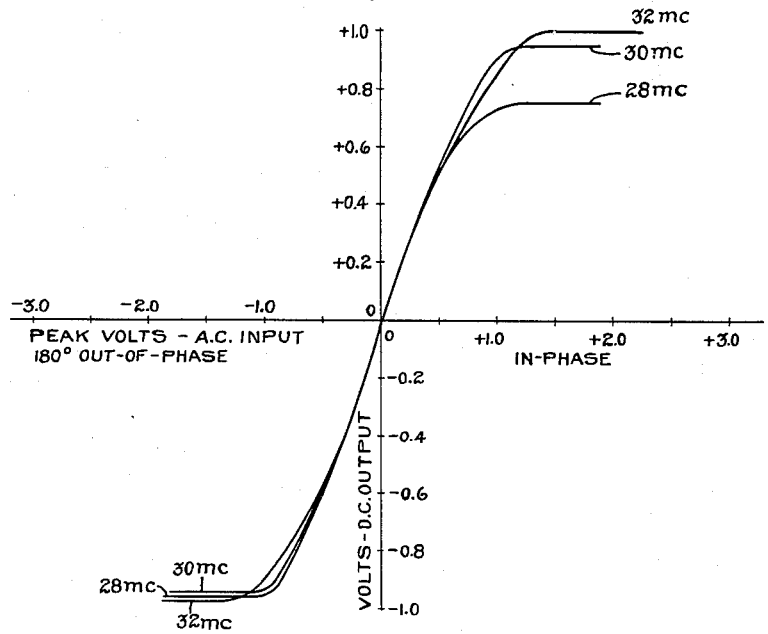
Fig. 5 is a group of test curves illustrating certain operating characteristics of a phase discriminator circuit embodying our invention.

In the vector diagram of Fig. 1, let it be assumed that the voltage $E_1$ is the alternating reference voltage and that the voltage $E_2$ is the alternating error voltage, which in this particular case leads the reference voltage by some phase angle $\phi$. The magnitude of the error voltage $E_2$ and the value of this phase angle are determined if the magnitudes of the voltage vectors $E_3$ and $E_4$ are known, $E_3$ being the voltage component of $E_2$ which is in phase with the reference voltage $E_1$ and $E_4$ being the voltage component of $E_2$ which is in quadrature phase with respect to the reference voltage $E_1$. The function of phase discriminator circuits embodying our invention is to derive the magnitude and sign of either or both of these two component voltages from $E_1$ and $E_2$. In an automatic radar tracking system of the type disclosed in the aforesaid copending application of Walter Hausz, relating to a combination amplitude-phase-comparison monopulse radar tracking and antenna system requiring only two antenna and two amplifying channels, the in-phase component $E_3$ may be directly proportional to the elevation angle of the target with respect to the antenna axis while the quadrature-phase component $E_4$ may be directly proportional to the azimuth angle of the target, or vice-versa. Therefore, these two component voltages can be directly employed to actuate automatic tracking circuits and servo-control mechanism so as to tend to align the antenna axis with the line of sight to the target.

A phase discriminator circuit embodying our invention is represented in generalized form in the schematic diagram of Fig. 2. The discriminator circuit comprises a section of high frequency transmission line 10. In Fig. 2 it is conventionally represented as an artificial transmission line having lumped series inductance elements 11 and lumped shunt capacitance elements 12. The line 10 is terminated at each end by connection to one of the two alternating voltage sources whose phase is to be compared. One of these sources 13 is represented as impressing a voltage $E_1$ on the transmission line and the other source 14 is represented as impressing a voltage $E_2$ on the line. It will be observed that the transmission line 10 is terminated, for the voltage impressed from either source, by the feed point impedance of the opposite source. As is well-known in transmission line theory, there will be no reflection of wave energy from one end of the transmission line, in response to voltages impressed on the other end, if the terminating impedance is equal to the characteristic impedance $Z_0$ of the transmission line. In this case, the internal impedance of each of the two sources 13 and 14, as seen from the transmission line, is made equal to the characteristic impedance of the line. Thus, each source forms of reflectionless termination for the energy supplied from the opposite source. Thus, a voltage wave starting out at source 13 is absorbed in the source 14 without reflection, and vice versa. Therefore, no standing waves will be produced on transmission line 10 as a result of energy supplied from either source alone.

If, however, two voltages of the same frequency are simultaneously impressed on the opposite ends of the transmission line 10, a standing wave will appear on the line, whose charactertistics will be dependent upon the relative magnitudes of the two voltages, the phase angle between them, and the electrical length of the line. Assume for the moment that transmission line 10 has an electrical length exactly equal to one-half wavelength at the operating frequency and that $E_1$ and $E_2$ are equal. The curves A, B and C in Fig. 2 then illustrate the voltage distribution along the line for three different phase relations between the voltages $E_1$ and $E_2$, as represented by the small vector arrows associated with each curve. For convenience, reference will be made to voltages existing at one-eighth wavelength points $a$, $b$, $c$, $d$ and $e$ along the line.

The curve A in Fig. 2 represents the resultant standing wave produced by two equal in-phase voltages $E_1$ and $E_2$ impressed on the line at the end points $a$ and $e$. As is well-known, a voltage wave travelling along a transmission line suffers a phase delay of 90 electrical degrees for each quarter-wave section of line traversed by the wave. Since the two voltage waves $E_1$ and $E_2$ travel along the line in opposite directions, each will have been delayed by 90 degrees at the midpoint $c$, and hence the resultant voltage at this point will be equal to their numerical sum. However, at the end point $a$, the applied voltage $E_1$ will have suffered no phase delay while the voltage $E_2$ will have been delayed 180 degrees. The converse is obviously true at the point $e$. Thus, at these points the voltages directly subtract, giving a minimum value (substantially equal to zero for the assumed condition of equal voltages).

Curve B in Fig. 2 shows the voltage distribution along the transmission line 10 for the same conditions, except that the applied voltages $E_1$ and $E_2$ are initially in phase quadrature. It will be observed in this case that the resultant voltage is a minimum at point $b$ and a maximum at the point $d$. Curve C in Fig. 2 similarly represents the voltage distribution for the case where the two input voltages $E_1$ and $E_2$ are in phase opposition. In this case the resultant voltage is a maximum at either end of the line and a minimum at the midpoint $c$. Looking at it in another way, the resultant standing voltage wave on the transmission line appears as though it were shifted by one-eighth wavelength for each 90 degree phase shift between the input voltages. The variation in voltage along the transmission line is, of course, a continuous function, so it will be obvious that intermediate values of phase angle between the input voltages $E_1$ and $E_2$ will produce intermediate voltage distribution curves. Also, if $E_1$ and $E_2$ are unequal, the shape of the resultant standing wave will not be changed, but it will obviously have a different alternating axis.

In the schematic diagram of Fig. 2 it will be noted that two detector circuits 15 and 16 are conventionally represented as having the voltages at points $a$ and $c$ impressed respectively thereon. The outputs of the two detectors are represented as being combined differentially and supplied to an output conductor 17. Therefore, the unidirectional voltage on the output conductor 17 will be substantially proportional to the algebraic difference of the magnitudes of alternating voltages on the transmission line 10 at these two points. From an inspection of the curves A, B and C, it will be observed that the output voltage will have a maximum value of one polarity when the source voltages are in phase, will be minimum when they are in phase quadrature, and will have a maximum value of opposite polarity when they are in phase opposition. It is apparent that this resultant output voltage is a function of the in-phase component of one of the source voltages with respect to the other. Analysis will readily show that the variation of the output voltage on conductor 17, will change in phase angle between the two source voltages, will be substantially linear, providing that the detectors 15 and 16 are operated in the linear regions of their characteristics.

Let it next be assumed that the points of connection of the detectors 15 and 16 are each moved one-eighth wavelength to the right in Fig. 2 so as to compare the voltages existing at points $b$ and $d$ on the line. Inspection will show that the output voltage in this case is a function of the quadrature-phase component of one of the source voltages with respect to the other, since the output voltage will be a minimum when the source voltages are either in-phase or out-of-phase and will have maximum values of opposite polarities when one of the source voltages leads or lags the other by 90 electrical degrees.

In the illustrative embodiment of the invention shown in Fig. 2, the transmission line 10 has been represented as having an electrical length equal a half wavelength and the spacing between the two points at which the line voltages are measured has been represented as one-quarter wavelength, because these values are generally most suitable for practical use. However, those familiar with transmission line theory will readily perceive that other lengths and spacings may be employed without departing from the fundamental principles of the invention. So long as each voltage source terminates the line in its characteristic impedance, there will be no interfering voltage waves on the line due to reflections. However, for lengths other than integral multiples of a half wavelength, or for spacings between the two measurement points other than an odd multiple of one-quarter wavelength, the output voltage on conductor 17 will be a different function of the phase relation and magnitude of the source voltages. For example, if the separation between the measurement points is less than, or greater than, an odd multiple of a quarter wavelength, the output voltage will be less than before, although the general shape of the voltage characteristic and the location of its minimum voltage point will not be changed appreciably. On the other hand, if the separation between the tap points is kept at one-quarter wavelength, but their positions along the line are different from those represented in the curves of Fig. 2, the circuit will respond to some component of the error voltage lying in between the quadrature and in-phase components.

The circuits of three practical embodiments of our invention are shown in greater detail in Fig. 3. Corresponding elements in these three diagrams have been designated by corresponding reference numerals since they are very similar in many respects.

The phase discriminator circuit of Fig. 3A operates in fundamentally the same manner as the circuit of Fig. 2, as previously described. It is arranged to respond to the in-phase component of an error signal voltage impressed on input terminal 20 with respect to a reference signal voltage of the same frequency impressed on input terminal 21. In this embodiment, the half-wave transmission line 22 is conventionally represented as being of the distributed type having uniformly-distributed series inductance 23 and uniformly-distributed shunt capacitance (represented in dotted outlines by the capacitances 24 existing between the high potential side of the line and ground). The error signal voltage and reference signal voltage are respectively impressed on the opposite ends of the line, with respect to ground, through conventional buffer amplifiers 25 and 26. The anodes of the amplifiers 25 and 26, which are represented as of the pentode type, are coupled respectively to the ungrounded terminals 27 and 28 of the transmission line 22 through blocking capacitors 29 and 30. One end point $a$ of the transmission line is connected to ground through a detector circuit comprising a rectifier 31 in series with a load resistor 32, shunted by a load capacitor 33. The midpoint c of the transmission line is similarly connected to ground through a detector circuit comprising a rectifier 34 in series with a load resistor 35, shunted by a load capactor 36. The rectifiers 31 and 34 may be of any suitable type, either electronic diodes or contact rectifiers. For example, we have found the type 1N34 germanium diode to be satisfactory for this purpose.

Return paths of low resistance for the unidirectional currents in the detector circuits are provided by the variable inductances 37 and 38 connected across the ends of the transmission line. These inductances are adjustable at the frequency of the input voltages to permit matching the feed point impedance of each amplifier to the characteristic impedance of the transmission line. The inductances may, for example, be adjusted by means of movable powdered-iron slugs.

It will be noted that the rectifiers 31 and 34 are reversed so that the unidirectional voltages developed across the load resistors 32 and 35 have opposite polarities with respect to ground. These two voltages are added algebraically in the circuit of Fig. 3A by impressing them across the series resistors 39 and 40. The rectified voltage proportional to the in-phase component of the error signal voltage is developed between output conductor 41, connected to the junction of resistors 39 and 40, and ground.

Fig. 3B shows a similar discriminator circuit for developing a rectified output voltage proportional to the quadrature-phase component of the error signal voltage. The circuit is identical to that of Fig. 3A with the exception that the detector circuits are energized respectively from the points b and d which are each spaced electrically one-eighth wavelength from the ends of the half-wave transmission line 22. Therefore, the corresponding elements in these detector circuits have been given the same reference numerals as in Fig. 3A with the suffix letter "a" added. The operation of this circuit will be understood without further explanation from what has been stated previously in connection with the generalized analysis of Fig. 2.

The circuit may be arranged to derive both the in-phase and quadrature-phase components simultaneously from the same transmission line. Such a circuit is illustrated in Fig. 3C, which is a combination of the circuits of Fig. 3A and 3B. When this discriminator circuit is employed in a pulse radar system, for example of the types described in the aforesaid Hausz application, the error signal information is in the form of an ultra-high frequency pulse voltage, derived from the echo voltage from the remote object which is being tracked. The reference signal is also a pulse voltage of the same ultra-high frequency derived from the transmitted pulses. In order to eliminate interference between pulses from different targets, it is common practice to gate the receiving system so as to be operative only over a short gate interval during the time of receipt of the selected echo pulse. In the circuits of Fig. 3C, the amplifiers 25 and 26 are represented as being gated by means of a pulse voltage supplied from terminal 42 to their screen grids, through respective chokes 43 and 44.

In the circuit of Fig. 3B, it will be apparent that the electrical phase shift between points a and b is the same as the phase shift between points d and e. Since we are interested only in the difference in voltage between the points b and d, this type of circuit can be simplified by omitting the two end sections a—b and d—e. A phase discriminator of this modified form is shown in Fig. 4. In this embodiment, the transmission line section 22a has an electrical length equal to one-quarter wavelength at the operating frequency. The circuit of Fig. 4 also includes a further modification in the manner of gating and combining the voltage outputs of the two detector circuits. The circuit of Fig. 4 is particularly adapted for use in a pulse radar equipment in which it is desired to minimize the effect of high-frequency pulse interference or pulse jamming. In this modification, the detected pulse voltages at the outputs of the two detector circuits are respectively supplied over conductors 50 and 51 to individual pulse amplifiers 52 and 53 before they are combined in the output resistors 39a and 40a. The amplifiers 52 and 53 are gated in well-known manner by pulses supplied from an input terminal 42, so as to be operative only over short intervals of time embracing a selected echo pulse. Since such gated pulse amplifiers are in common use in the radar art, they have been indicated only schematically. The operation of the system is otherwise essentially the same as that of the circuit of Fig. 3B, and the rectified quadrature voltage component appears between the output conductor 41a and ground, as before.

Fig. 5 is a group of experimental curves illustrating certain characteristics of a particular phase discriminator circuit constructed like the circuit of Fig. 3A. The transmission line 22 was constructed to be electrically one-half wavelength long at 30 megacycles. The curves show the variation in unidirectional output voltage with variation of the alternating error signal voltage, at three different frequencies. The error voltage was either 180 degrees out-of-phase or in-phase with the reference voltage, as indicated, and the curves show the discriminator characteristics for input frequencies of 28 megacycles and 32 megacycles, as well as for the 30-megacycle frequency to which the transmission line was tuned. It will be observed from these curves that the discriminator characteristic was substantially unaffected by these frequency variations over a considerable portion of the operating range.

Figure 6:
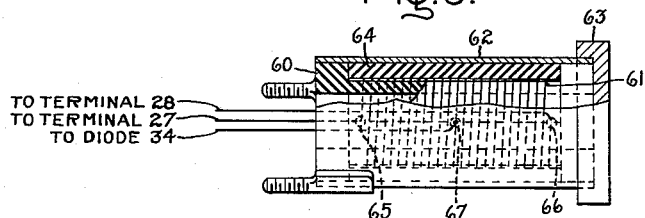
Fig. 6 is a side elevation view, partly in section, showing the construction of a high-frequency transmission line suitable for use in our phase comparator circuits.

Fig. 6 illustrates one suitable form of construction for the transmission line section, which has been employed in practice. It comprises a polystyrene coil form 60 on which is wound a single-layer coil 61 of enameled copper wire. The ground plane is provided by an outer shielding cylinder 62, which may be of any suitable conducting material, for example brass. One end of the cylinder 62 is closed by a cap 63, which is also of any suitable conducting material, for example brass, secured thereto by soldering, brazing, or other suitable means. The proper capacity between the coil 61 and ground plane 62 is provided by means of a split cylinder 64 of a suitable dielectric material, which may also be polystyrene for example, fitted over the coil 61. The terminals of the coil 61 are brought out through the center of the coil form 60 after passing through small holes 65 and 66 therein, and the center tap connection is similarly brought out through a hole 67.

Figure 7:
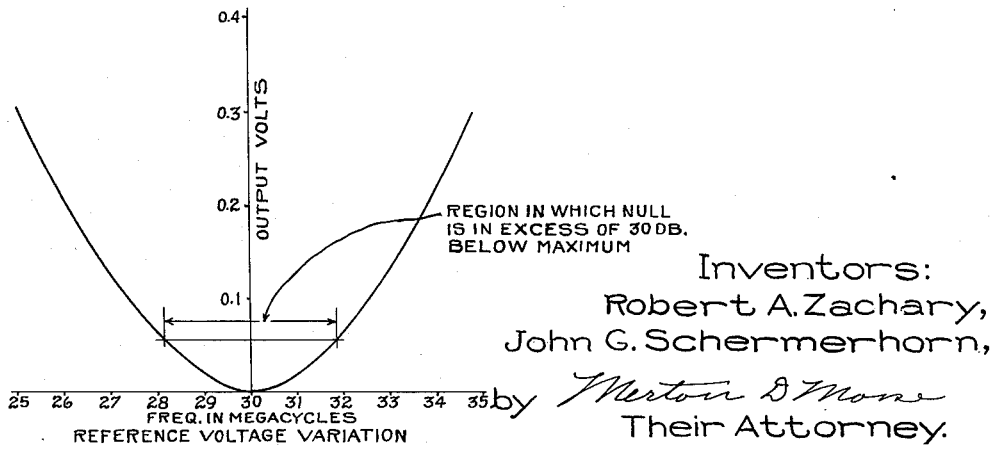
Fig. 7 is another test curve illustrating certain other operating characteristics of a circuit embodying our invention.

Our phase discriminator circuits not only possess a high degree of frequency stability, as previously indicated in connection with the curves of Fig. 5, but also have another important advantage: the discriminator output voltage is very nearly zero when the error signal voltage is zero, over a wide band of frequencies. Fig. 7 is an experimental curve, taken on the same circuit as the curves of Fig. 5, which shows the variation in output voltage with variations in the frequency of the reference voltage alone. It will be observed that the output was 30 decibels below maximum from about 28 to 32 megacycles. With more careful matching of circuit components, it is possible to obtain substantially zero output over a much wider range of frequencies.

While specific embodiments have been shown and described, it will of course be understood that various other modifications may be made without departing from the invention. For example, the same principles can be applied to other forms of electrical transmission paths than transmission lines. A waveguide type of transmission path may be employed for microwave applications, in which case the energy may be extracted at the two spaced points by suitable forms of microwave probes or crystal detector structures known to the art. The appended claims are therefore intended to cover any such modifications within the true spirit and scope of the invention.

What we claim as new and desire to secure by Letters Patent of the United States is:

1. A phase detector circuit responsive to the phase difference between two alternating voltages of the same frequency, comprising an electrical transmission path, two means for respectively impressing said voltages on said path for transmission therethrough in opposite directions, each of said means substantially terminating said path in its characteristic impedance, and means for detecting the difference in voltage between two points spaced apart along said path.

2. A phase detector circuit responsive to the phase difference between two alternating voltages of the same frequency, comprising an electrical transmission path, two means for respectively impressing said voltages on said path for transmission therethrough in opposite directions, each of said means substantially terminating said path in its characteristic impedance, and means for detecting the difference in voltage between two points spaced apart along said path, said points being spaced apart by an odd multiple of a quarter wavelength at said frequency.

3. A phase detector circuit responsive to the phase difference between two alternating voltages of the same frequency, comprising an electrical transmission path, two means for respectively impressing said voltages on said path for transmission therethrough in opposite directions, each of said means substantially terminating said path in its characteristic impedance, and means for detecting the difference in voltage between two points spaced apart along said path, said points being spaced apart by an odd multiple of a quarter wavelength at said frequency, and said path having an electrical length equal to a multiple, including unity of a quarter wavelength.

4. A phase discriminator circuit responsive to the phase angle between two alternating voltages of the same frequency, comprising a transmission line, means for impressing said voltages respectively on opposite ends of said line, each of said means substantially terminating said line in its characteristic impedance, and means for detecting the difference in voltage between two points on said line electrically spaced apart by an odd multiple, including unity, of a quarter wavelength at said frequency.

5. A phase comparator circuit responsive to alternating potentials from two sources, said potentials having the same frequency and an unknown phase angle between them, comprising a transmission line having an electrical length at least equal to one-quarter wavelength at said frequency, means for impressing said voltages respectively on opposite ends of said line, each of said means substantially terminating said line in its characteristic impedance, and means for detecting the difference in voltage between two points on said line electrically spaced apart by one-quarter wavelength at said frequency.

6. A phase comparator circuit responsive to alternating potentials from two sources, said potentials having the same frequency and an unknown phase angle between them, comprising a transmission path having an electrical length equal to a multiple, including unity, of a quarter wavelength at said frequency, said two sources being respectively connected across opposite ends of said path, the internal impedance of each source as seen from said path being substantially equal to the characteristic impedance of said path, whereby each source provides a reflectionless termination for the potential impressed from the other source, means for rectifying the alternating voltages existing at two points along said path electrically spaced apart by an odd multiple, including unity, of a quarter wavelength at said frequency, and means for electrically comparing said two voltages.

7. An electrical comparator circuit for determining the magnitude and sign of a particular vector component of an alternating error voltage of unknown phase with respect to a reference voltage of the same frequency, comprising a transmission line having an electrical length at least equal to one-quarter wavelength at said frequency, coupling means for impressing said voltages respectively on opposite ends of said line, each of said coupling means presenting an impedance to said line which provides a substantially reflectionless termination at said frequency, means for developing two unidirectional potentials respectively proportional to the alternating voltages at two points on said line spaced electrically one-quarter wavelength apart, and means for subtracting one of said potentials from the other to produce a voltage which is a function of said component.

8. An electrical comparator circuit for determining the magnitude and sign of a particular vector component of an alternating error voltage of unknown phase with respect to a reference voltage of the same frequency, comprising a transmission line having an electrical length equal to an integral multiple, including unity, of a quarter wavelength at said frequency, coupling means for impressing said voltages respectively on opposite ends of said line, the feed point impedance of each of said means substantially matching the characteristic impedance of said line, means for rectifying the alternating voltage existing at two points spaced electrically one-quarter wavelength apart on said line, at least one of said points being spaced an integral multiple, including unity, of an eighth wavelength from one end of said line and means for determining the difference between the voltages existing at said points.

9. A phase discriminator circuit for determining the magnitude and sign of either the in-phase or quadrature-phase vector of an alternating error voltage, supplied from a first source, with respect to an alternating reference voltage of the same frequency, supplied from a second source, comprising a transmission line electrically one-half wavelength long at said frequency and having its opposite ends coupled respectively to said two sources, the feed point impedance of each source being substantially matched to the characteristic impedance of said line, a pair of detectors connected across said line at two points electrically spaced apart by one-quarter wavelength along said line, at least one of said points being spaced an integral multiple, including unity, of one-eighth wavelength from one end of said line, and means for subtracting the unidirectional output voltage of one of said detectors from the output voltage of the other detector, thereby to produce a voltage which is a function of said vector.

10. A phase discriminator circuit for determining the magnitudes and signs of the in-phase and quadrature-phase vectors of an alternating error voltage, supplied from a first source, with respect to an alternating reference voltage of the same frequency, supplied from a second source, comprising a transmission line electrically one-half wavelength long at said frequency and having its opposite ends coupled respectively to said two sources, the feed point impedance of each source being substantially matched to the characteristic impedance of said line, two pairs of detector circuits, each pair being connected across said line at two points, one pair being connected respectively to the midpoint and to one end of said line, the other pair being connected to points electrically one-quarter wavelength apart and electrically one-eighth wavelength from each end of said line, and means for subtracting the unidirectional output voltage of one detector of each pair from the output voltage of the other detector of that pair, thereby to produce two voltages whose magnitudes and signs are functions of said two vectors.

11. An electrical comparator circuit, according to claim 8, for determining the magnitude and sign of the in-phase vector component of said error voltage, wherein said transmission line has an electrical length equal to one-half wavelength and said points are located at one end and at the midpoint of said line respectively.

12. An electrical comparator circuit, according to claim 8, for determining the magnitude and sign of the quadrature-phase vector component of said error voltage, wherein said transmission line has an electrical length equal to one-half wavelength and said points are spaced one-quarter wavelength apart and one-eighth wavelength from opposite ends of said line.

13. An electrical comparator circuit, according to claim 8, for determining the magnitude and sign of the quadrature-phase vector component of said error voltage, wherein said transmission line has an electrical length equal to one-quarter wavelength and said points are at opposite ends of said line.

References Cited in the file of this patent

UNITED STATES PATENTS

| | | |
|---|---|---|
| 2,405,073 | Troell | July 30, 1946 |
| 2,429,636 | McCoy | Oct. 28, 1947 |
| 2,442,606 | Korman | June 1, 1948 |
| 2,467,361 | Blewett | Apr. 12, 1949 |